United States Patent

Korshak et al.

[15] 3,652,408

[45] Mar. 28, 1972

[54] AN ANTIFRICTION MATERIAL

[72] Inventors: Vasily Vladimirovich Korshak, ulitsa Gubkina, 4, kv. 81; Irina Alexandrovna Gribova, ulitsa Vavilova, 10, korpus 20, kv. 31; Alexandr Petrovich Krasnov, prospekt Kalinina, 31, kv. 28; Mikhail Mikhailovich Teplyakov, Seleznevskaya ulitsa, 13, kv. 3; Hoza Dmitrievna Fedorova, st. Petrovshoe-Razumovskoe, 1; Alla Nikolaevna Chumaevskaya, Leninsky prospekt, 101, korpus 163, kv. 86, all of Moscow, U.S.S.R.

[22] Filed: Jan. 11, 1968

[21] Appl. No.: 697,024

[52] U.S. Cl. ............................................................252/12
[51] Int. Cl. ......................................C10m 5/26, C10m 5/22
[58] Field of Search ...........................252/12, 12.2, 12.4, 12.6

[56] References Cited

UNITED STATES PATENTS

| | | | |
|---|---|---|---|
| 3,014,865 | 12/1961 | Seniff | 252/12 |
| 3,174,947 | 3/1965 | Marvel et al. | 260/47 |
| 3,433,742 | 3/1969 | Banta | 252/12 |
| 3,502,579 | 3/1970 | Johns | 252/12 |

*Primary Examiner*—Daniel E. Wyman
*Assistant Examiner*—I. Vaughn
*Attorney*—Waters, Roditi, Schwartz & Nissen

[57] ABSTRACT

Antifriction materials comprising 10–50 percent of a polybenzimidazol and 90–50 percent of a filler such as molybdenum disulfide are made by mixing the above materials in powdered form and pressing the mixture at 350–550° C. and a pressure of 800–1,000 kg./cm$^2$.

2 Claims, No Drawings

AN ANTIFRICTION MATERIAL

The present invention relates to antifriction materials, such as plastic and methods of manufacturing articles therefrom which, articles are intended for use in dry friction assemblies.

There are known antifriction materials prepared on the basis of cyclic polymers such as polyimides, and fillers, such as graphite and molybdenum disulphide.

A disadvantage of the known antifriction materials prepared on the basis of said cyclic polymers is that at high temperatures the value of their coefficient of friction is great and not stable.

An object of the present invention is the elimination of the afore-said disadvantage.

The object of the present invention is to provide an antifriction material, the value of whose coefficient of friction at high temperatures is small and stable, and to provide a method of manufacturing articles therefrom.

In accordance with the invention this object is accomplished by virtue of the fact that in the antifriction material prepared on the basis of a cyclic polymer and molybdenum disulphide as a filler, a polybenzimidazol is used as the cyclic polymers.

The polybenzimidazols to be used in the present invention are conventional in the art, their composition and method of production being known as evidenced by the publication of A.A. Izyneev, V.V. Korshak, T.M. Frunze and V.V. Kurashev in the Bulletin of the Academy of Sciences of the U.S.S.R., p. Depart. p 1,828 (1963).

It is expedient to use an antifriction material containing 10–50 percent of polybenzimidazol from the total weight of the material.

In accordance with the present invention the method to be used for manufacturing articles from the proposed antifriction material, consists in that polybenzimidazol and molybdenum disulphide, both in powder form, are mixed, whereupon the thus obtained mix is pressed at a temperature of 350°–550° C. and a pressure of 800–1,000 kg./cm².

In case the polybenzimidazol has no clear-cut melting point, articles are manufactured from the antifriction material by a method in which polybenzimidazol containing not more than 30 percent of polyaminoamide, and molybdenum disulphide, both in powder form, are mixed, and the obtained mix is then pressed at a temperature of 450°–550° C. and a pressure of 300–1,000 kg./cm².

The components of the antifriction material filler may also include such metal powders as graphite and hard minerals.

Below are given some specific examples of manufacturing articles from the proposed antifriction material.

EXAMPLE 1.

Three-hundred grams of polybenzimidazol prepared from tetraaminodiphenylmethane and diphenyl-oxidedicarboxylic acid, and 2,700 grams of powdered molybdenum disulphide with the size of particles from 1 to 15 mk., are charged into a vibrating mixer and stirred therein for 1.5 minutes.

The thus obtained mix is pressed at a temperature of 360° C. and a pressure of 800–1,000 kg./cm².

EXAMPLE 2

Three-hundred grams of polybenzimidazol prepared from diaminotolydine and isophotalic acid, 750 grams of copper powder and 1,950 grams of powdered molybdenum disulphide with the size of particles from 1 to 15 mk., are charged into a vibrating mixer and stirred therein for 1.5 minutes.

The thus obtained mix is pressed at a temperature of 370° C. and a pressure of 800–1,000 kg./cm².

EXAMPLE 3

Three-hundred grams of polybenzimidazol prepared from tetraaminodiphenylmethane and diphenyloxidedicarboxylic acid, 750 grams of silver powder, 150 grams of quartz powder and 1,800 grams of powdered molybdenum disulphide with the size of particles from 1 to 15 mk., are charged into a vibrating mixer.

The mixing conditions of the powders and the manufacturing of articles in this example are analogous to those according to Example 1.

EXAMPLE 4

Sixty grams of polybenzimidazol prepared from diaminobenzidine and isophthalic acid and containing 25 percent of polyaminoamide with incomplete ring formation, 40 grams of silver powder, 60 grams of powdered molybdenum disulphide with the size of particles from 1 to 15 mk. and 40 grams of graphite are charged into a vibrating mixer and stirred for 6 minutes. The thus obtained mix is pressed at a temperature of 500°–510° C. and a pressure of 1,000 kg./cm².

The antifriction material obtained according to Examples 1–4 possesses at high temperatures a stable and small coefficient of friction and has the following indices:

| | |
|---|---|
| Brinell hardness number | 25–30 |
| compressive strength | 800–1200 kg./cm.² |
| coefficient of friction | 0.08–0.1 |

Though the present invention has been described with reference to the preferred form of carrying the invention into effect, it is evident that various modifications and variations may be made without departing from the spirit and scope of the invention, which those skilled in the art will easily understand.

These modifications and variations are considered not to be departing from the spirit and scope of the invention and the appended claims.

What is claimed is:

1. An antifriction material comprising 10–50 percent by weight of a polybenzimidazole prepared by reacting tetraminodiphenylmethane with diphenyloxidedicarboxylic acid, or diaminotoludine with isophthalic acid, or diaminobenzidine with isopthalic acid, and 90–50 percent by weight of molybdenum disulfide.

2. An antifriction material as claimed in claim 1 which further contains an effective amount of at least one material selected from the group consisting of copper powder, quartz powder, silver powder and graphite.

* * * * *